Jan. 19, 1937.   P. H. THEISEN   2,068,158
FLUSHING VALVE FOR TOILETS
Filed March 10, 1936
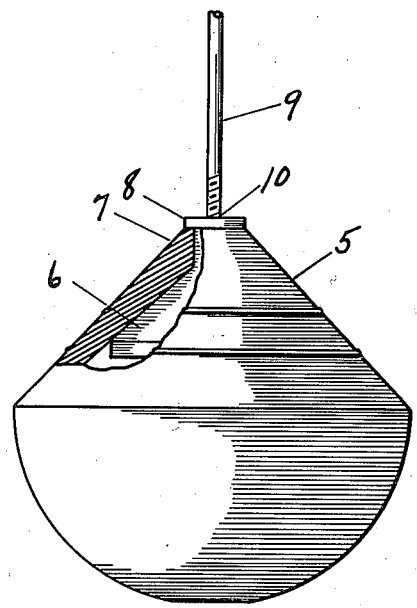
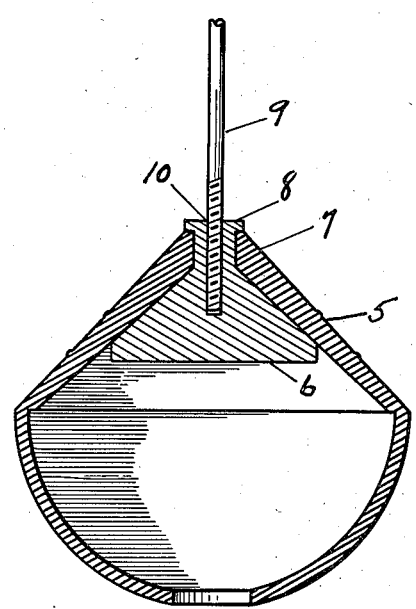
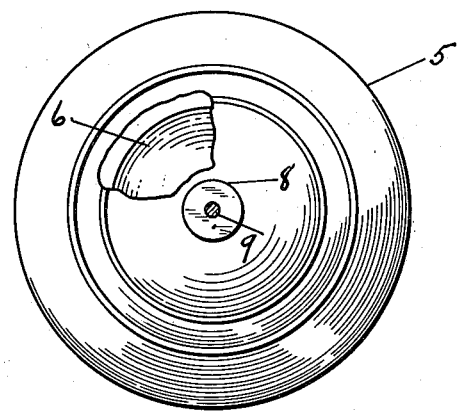
INVENTOR.
PHILLIP H. THEISEN
BY
ATTORNEY.

Patented Jan. 19, 1937

2,068,158

UNITED STATES PATENT OFFICE 2,068,158

FLUSHING VALVE FOR TOILETS

Phillip H. Theisen, San Francisco, Calif.

Application March 10, 1936, Serial No. 68,066

4 Claims. (Cl. 4—56)

The present invention relates generally to new and useful improvements in ball flush valves adapted to be used in toilet flushing boxes, but has more particular reference to a ball flush valve of the rubber and counter-weighted type.

The primary object of the present invention is to provide a ball valve of hollow type and adapted to be counter-weighted in accordance with the water pressure contained in said toilet, flushing box.

Another object of the instant invention is to provide a hollow interior ball flush valve, that will always serve to shut off the flow of water at a determined time.

Still another object of the instant invention is to provide a rubber flush valve that will always seat properly, thus serving to close the water supply contained in the conventional toilet flushing box.

A still further object of the present invention is to provide a ball flushing valve that will conserve the flow of water used for toilet flushing purposes.

A still further object of the present invention is to provide a toilet flushing valve of the rubber ball type that may be counter-weighted to assure a perfect seal between the valve and valve seat and one that may be interchanged from time to time as the rubber deteriorates.

Ancillary to the foregoing objects is to provide a ball flush valve of the hollow rubber type that may be manufactured for a nominal sum and one that may be adapted to receive a conical shaped counter-weight, said counter-weight being interchangeable at a moments notice.

Applicant is aware that hollow ball flush valves are in use today, but, applicant believes that none have the counter-weight fastened at the upper inside half of the ball valve.

Further objects and advantages will become apparent with reference to the accompanying drawing and the subjoined specification in which:

Figure 1 is a side elevational view of my improved ball flush valve, rubber being partially broken away to illustrate the counter-weight.

Figure 2 is a sectional detail showing the counter-weight in position thereto in relation to the rubber ball flush valve.

Figure 3 is a top plan view with the upper part of the ball partially broken away showing the counter-weight.

Referring more particularly to the drawing in which the numeral 5 designates the rubber ball valve which serves to hold the counter-weight 6, said counter-weight is held in position by means of the ball lip 7 and is urged against the bead 8 of the weight 6.

The stem 9 is fastened to the weight 6 at the position 10, this stem being the lifting means whereby the ball flush valve is lifted to unseat the valve as is the usual procedure in all other ball flush valves and does not form any part of the present invention.

In recapitulation:—

The rubber ball flush valve is tripped in the usual manner and the counter-weight is utilized to cause the valve to bear down and seal the valve seat, thus causing the valve to make a firmer contact with the valve seat, shutting the flow of water off completely, the counter-weight may be of different shapes and sizes to offset the pressure of water contained in the flushing box.

What I claim and desire to secure by Letters Patent of the United States Patent Office is the following:—

1. In a ball flush valve of the class indicated, comprising, a resilient ball valve, a counter-weight associated therewith and thread means for attaching said lifting stem to said counter-weight.

2. In a flushing ball valve of the class described, comprising, a hollow rubber ball valve, said rubber ball valve being adapted to seal a valve seat, and embodying a threaded and weighted stem.

3. In a ball flush valve of the class described, comprising a threaded stem having a counter-weight associated therewith, said counter-weight being adapted to be interchanged with said ball flush valve.

4. In a ball flush valve of the class described, comprising, a rubber ball valve, said ball valve having an opening at the top and adapted to support a counter-weight arranged in the upper end thereof, and a stem screwed into said weight.

PHILLIP H. THEISEN.